United States Patent Office 3,741,887
Patented June 26, 1973

3,741,887
OXIDATIVE SWEETENING WITH A CALCINED COMPOSITE OF AN ALKALI METAL SILICATE, AN IRON SALT AND A COPPER SALT
Sun W. Chun, Murrysville, Harry A. Hamilton, Natrona Heights, and Angelo A. Montagna, Monroeville, Pa., assignors to Gulf Research & Development Company, Pittsburgh, Pa.
No Drawing. Filed July 15, 1971, Ser. No. 165,792
Int. Cl. C10g 27/04
U.S. Cl. 208—191
9 Claims

ABSTRACT OF THE DISCLOSURE

A copper-iron group metal catalyst useful in the conversion of thiols to disulfides is prepared by forming an aqueous solution of sodium or potassium silicate; and a soluble iron group metal salt, such as ferric chloride, and cogelling the solution with a basic agent, such as ammonia, to form a precipitate. This precipitate is optionally dried and/or calcined before the addition thereto of a copper salt, such as copper chloride. After the addition of the copper salt, the composite is dried and calcined.

---

This invention relates to a method of preparing a catalyst comprising silicon, oxygen, an iron group metal, copper and either potassium or sodium for use in a sweetening process.

BACKGROUND OF THE INVENTION

Thiols (mercaptans) are sulfur analogues of alcohols and contain an —SH (sulfhydril) group. Many petroleum fractions contain alkanethiols as minor constituents and these thiols impart to such fractions and their distillates an objectionable odor and corrosiveness. Distillates containing such objectionable sulfur derivatives are known as "sour" distillates, and processes for oxidizing the thiols or sulfhydril containing compounds to less objectionable disulfides are known as sweetening processes. The sweetening process is believed to be an oxidative coupling of two mercaptan molecules to give a disulfide, and thus the processes are normally and preferably run in the presence of a gas containing free molecular oxygen.

One of the most widely used catalysts for sweetening of sour petroleum fractions is copper chloride either in solution or on various supports. The use of sodium plumbite and caustic are also known. More recently, a patent to Norman L. Carr et al., U.S. Pat. 3,491,020, suggests the use of a catalyst composite comprising an inorganic amorphous polymer of iron, silicon and oxygen for the selective oxidation of mercaptans to disulfides. All of the above processes suffer, however, from low throughput life before the catalyst is required to be regenerated.

It is taught in the Carr et al. reference that it is important that the silica sol used to prepare the iron-silicon-oxygen catalyst be free or substantially free of cationic impurities. Especially to be avoided are the alkali metals, as, for example, sodium (see column 2, lines 44–54). According to Carr et al., these cations detract from the integrity of the catalyst structure and inhibit the catalytic properties of the final catalyst.

It has now been found, quite surprisingly and in accordance with the invention, that a catalyst having superior activity for the sweetening of sour hydrocarbons can be prepared using sodium and potassium silicate solutions. The method of preparation comprises forming an aqueous solution of (1) an alkali metal silicate selected from the group consisting of sodium silicate and potassium silicate and (2) a Group VIII iron group metal salt;

co-precipitating the solution to form a cogelled precipitate;
optionally drying and/or calcining said precipitate;
adding a solution of a copper salt to said precipitate; and
drying and calcining said copper containing precipitate.

The atomic ratio of the iron group metal to silicon to oxygen in the final product is suitably from 1:2:5.5 to 1:12:25.5. The atomic ratio of copper to the iron group metal is from 0.01:1 to 1.5:1.

The catalyst of this invention is preferably prepared by impregnating an aqueous solution of $CuCl_2$ by incipient wetness on the calcined support. The support is a composite comprising an iron group metal, silicon, oxygen and an alkali metal selected from the group consisting of sodium and potassium. So far as can be established, the elements are chemically associated together as an inorganic amorphous copolymer. The method of preparing the final catalyst in some unknown manner confers unusual catalytic properties to the catalyst for the sweetening of sour hydrocarbons.

The catalyst of this invention is prepared as follows: An aqueous solution of an alkali-metal silicate from the group consisting of a sodium silicate hydrosol and a potassium silicate hydrosol is mixed with an aqueous solution of a compound capable of yielding iron group metal cations in solution, such as ferric chloride; and cogelation of the resulting mixture is accomplished by raising the pH with a suitable base such as ammonia. Copper may be added to the gelatinous precipitate as an aqueous solution of a copper salt such as copper chloride and homogenized therewith by stirring or blending. Optionally, but preferably, the gelatinous precipitate is dried and calcined before the addition of the aqueous copper salt solution by impregnation. By an "iron group metal" is meant iron, nickel and cobalt from Group VIII. The commercially available sodium silicate solution and potassium silicate solution, sometimes called "water glass," are particularly satisfactory and recommended. These solutions usually contain about 30 percent by weight $SiO_2$. "Water glass" is prepared by fusing silica with sodium carbonate or potassium carbonate and the product is a colloidal suspension of silica in sodium or potassium silicate.

According to the method of this invention, the desired alkali metal silicate hydrosol is mixed with an aqueous solution of the compound which yields the desired Group VIII iron group metal cation in solution. Examples of the salts of Group VIII iron group metals which may be successfully employed in this invention are the nitrates, sulfates, halides, acetates, nitrites, etc., and suitable organometallic compounds of cobalt, nickel and iron.

A list of suitable salts includes, but is not limited to: $FeCl_3$; $Fe(NO_3)_3$; $Fe(NO_3)_2$; $FeCl_2$; $Fe(NO_2)_2$; $FeBr_3$; $Fe(C_2H_3O_2)_3$; $Fe_2(C_2O_4)_3 \cdot 6H_2O$; $FeOCl$;

$Fe(SO_4)_3$;

$FeBr_3$; $Fe(C_2H_3O_2)_3$; $Fe_2(C_2O_4)_3 \cdot 6H_2O$; $FeOCl$; $Fe(SO_4)_3$
$Fe(Cl_4)_3 \cdot 6H_2O$; $NiCl_2$; $NiF_2$; $Ni(NO_3)_2$; $Ni(C_2H_3O_2)_2$;

The most preferred iron group metal salt for use in the practice of the instant invention is ferric chloride. Ferric chloride is readily soluble in water, is inexpensive, is readily available in quantity, easily forms an insoluble gelatinous precipitate in the presence of basic substances such as ammonia, thereby readily permitting the desired cogelation and yields a finish catalytic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state. The solution of iron group metal cations will generally contain the cations of only one of the three iron group metals; however, the solution can contain a mixture of the cations of any two or all three of the iron group metals.

Examples of copper salts which may be successfully employed in this invention are the halides, nitrates, sulfate and acetate, i.e. cupric chloride; cupric bromide; cupric iodide; cupric fluoride; copper nitrate; copper sulfate and copper acetate. Copper chloride ($CuCl_2$) is the most preferred salt.

The solution of the silicate hydrosol and iron group metal cation should be thoroughly homogenized by appropriate mixing. Cogelation is then brought about by increasing the pH of the mixture. The preferred agent for increasing the pH of the mixture is ammonia gas which may be sprayed into the solution. The pH of the solution at the start is usually about 3 to 3.5 and is raised to about 7 to 9, preferably 7.5 to 8 by the use of an alkaline agent such as ammonia.

Ammonia is inexpensive, easily available, and leaves no residue upon calcination of the resulting gel. Other bases, such as trimethyl ammonium hydroxide, hydrazine or quinolinium hydroxide, can be employed, but they are expensive and are considered to have no particular advantage. When salts of nickel and cobalt and such metals are used as the source of iron group metal cations, ammonia cannot be used to adjust the pH since these metals form complex amines in admixture with ammonia. A convenient means of adjusting the pH, when salts of metals such as nickel or cobalt are used, is to add ammonium bicarbonate.

On addition of the base to the iron group metal cation-silica sol solution, a slurry is formed consisting of a gelatinous precipitate and water. Although this gelatinous precipitate can be removed at will, it is preferred to allow it to stand about 16 hours to assure complete precipitation. The precipitate can be separated from the supernatant liquid in any convenient manner as, for example, by filtration. The precipitate is then washed with water to remove any contaminants. This washing process advantageously can be continued until conductivity measurements reach a constant level.

Not all concentrations of the iron group metals applicable to the practice of the instant invention can be employed under the process conditions herein set forth. At metal concentrations in excess of about 60 percent by weight, the catalyst demonstrates crystalline characteristics and displays an attendant loss of desirable properties. The iron group metal and silica sol are preferably used in proportions to make the catalytic composite with an atomic ratio of iron group metal to silicon to oxygen within the range of about 1:2:5.5 to about 1:12:25.5. The most preferred catalytic composite contains an iron group metal to silicon to oxygen atomic ratio of about 1:4:9.5. In the oxidized catalytic composite there is sufficient oxygen to fully satify the valence requirements of both the iron group metal and the silicon. This invention contemplates the utilization of either one, two or all three iron group metals in the catalyst composite, preferably with a total iron group metal content within the specified proportions.

The copper salt can be dispersed in the gelatinous precipitate by any suitable means. Usually the copper salt is added as a solution to the gelatinous precipitate and is stirred or blended until a homogeneous gelatinous mass is obtained. A sufficient amount of the copper salt should be used so that the final catalyst has from 2 to 50 weight percent, preferably from 5 to 35 percent by weight, of the copper salt based on the total weight of the catalyst. In all cases, the salt concentrations are calculated on the basis the salts are anhydrous, i.e. no water of hydration. Normally, an aqueous solution of the copper salt is employed, although alcoholic or other high dielectric constant mediums, such as dioxane or dimethylsulfoxide, can be employed to form copper salt solutions. By a "high dielectric constant material" is meant one having a dielectric constant of over eight at 25° C. Suitable copper salts include the halides, nitrates, sulfates and acetate such as copper chloride; copper bromide; copper iodide; copper fluoride; copper nitrate, copper acetate; copper teraamine nitrate; and copper perchlorate.

The amount of copper to employ should be such that the atomic ratio of copper to the iron group metal is from 0.05:1 to 1.5:1, preferably from 0.1:1 to 1:1. Using these atomic ratios of copper to iron group metal and the above stated ratio of iron to silicon, the final catalyst has from 2 to 50 weight percent of the copper salt, preferably from 5 to 35 weight percent of the copper salt.

The gelatinous precipitate can, optionally, be first dried, for example, in a forced draft oven, at a temperature in the range of from 200° F. to 300° F. over a period of from 10 to 30 hours. The dried product can then be calcined in air at a temperature from 800° F. to 1000° F. over a period of from 10 to 20 hours, preferably at from about 850° F. to 950° F. for from about 8 to 16 hours, to form the inorganic polymer base for the catalyst of the instant invention.

The copper salt as described above may suitable be added to the dried and optionally calcined precipitate by any suitable procedure. Usually the copper salt is added by impregnation from a solution, usually aqueous, of a suitable copper salt, usually copper chloride. The preferred method of impregnation is the incipient wetness technique where a minimum amount of excess solution is employed. Other suitable impregnation techniques such as vacuum impregnation can be employed. Prior to impregnation, the dried and optionally calcined composite can be, of course, broken up into any convenient size, as for example, 6 to 10 mesh. The composite can then be dried in any convenient manner and for this purpose a temperature in the range of from 200° F. to 300° F. is used for a period of about 10 to 30 hours. Once the impregnated composite has been dried it can be calcined. The temperature at which the impregnated composite is calcined is from 400° F. to 800° F. for a period of from 10 to 30 hours, preferably from 500° F. to 700° F. for about 16 hours.

As noted above, the very high surface area catalyst comprising a cogelled chemical composite of iron group metal, oxygen and silicon is a highly effective catalyst for the selective oxidation of thiols to disulfides. The catalytic composite described with reference to iron as the iron group metal is a chemical combination comprising iron, oxygen and silicon in an amorphous, inorganic, high molecular weight polymer-like material containing multiple and random Si—O—Si, Si—O—Fe, and Fe—O—Fe linkages, with each silicon atom directly united to four oxygen atoms and each iron atom directly united to three oxygen atoms. The nature of the catalyst is such that some oxygen is readily available from within the structure for selective oxidation of adsorbed thiols. It is not known for certain whether there is a chemical interaction of the copper salt with the iron in the inorganic polymer structure but it is believed possible that some $CuFe_2O_4$ may be forming. If such is the case it is indeed surprising since the iron is already believed to be chemically combined in an amorphous structure. No evidence of the presence of potassium silicate or sodium silicate is noted in the final product. It is believed the potassium and sodium are finely dispersed in the structure of the amorphous polymer as their oxides.

The composite has utility as a low temperature oxidation catalyst and an adsorbent for sulfur-containing compounds. In one embodiment, the composite can be used in an improved method for sweetening sour hydrocarbons. More particularly the catalytic composite can be used for selectively oxidizing mercaptan sulfur, which is contained in a hydrocarbon, to form disulfide sulfur at a low temperature.

It has been found that if a petroleum distillate containing mercaptans is subjected, at a suitable temperature, to contact with air or another source of oxygen in the presence of the cogelled catalytic copper containing composite of the process of the instant invention, such mercaptans are converted to alkyl disulfides or other noncorrosive compounds having no offensive odor and the distillate is thus "doctor" negative.

The charge stock which can be sweetened using the catalyst of this invention can be any atmospheric petroleum distillate having a boiling point from about 50° F. to 700° F. This boiling range encompasses petroleum fractions such as liquid petroleum gas to heavy distillate fuel oils. Usually sweetening processes are relegated to the lighter boiling charge stocks such as liquid petroleum gas, gasolines and naphthas. It is one of the advantages of the catalysts of this invention that they are useful for the sweetening of higher boiling petroleum distillates such as kerosene and heavy distillate fuel oils.

The contact treatment with the catalytic composite described above can be carried out at a temperature as low as 0° F. to 300° F. The preferred temperatures are in the range of from 80° F. to 200° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cycle time of the catalyst and reduces the frequency of reactivation. The oxygen concentration of the feed stock may range then, from no oxygen in the feed stock, to that naturally present, to that oxygen concentration resulting from complete saturation of the feed stock with air, or indeed in some cases the amount of air may exceed the saturation limit of the oil. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to a suitable regeneration treatment for reactivation when it becomes spent.

The catalyst does lose its activity in use, possibly as a result of a reduction in lattice oxygen within the catalyst or gum formation. It is not affected by by-product water. For this reason it is advantageous to employ multiple reactors which are alternately on stream. This permits the reactivation of one catalyst bed while the other or others continue to function. It has been found that the highest catalytic activity is achieved by a short-time activation with air at atmospheric pressure. The main purpose of reactivation is to remove gum and to replenish the oxygen in the lattice structure of the catalyst.

In a general embodiment of this invention, the sour hydrocarbon feed with or without added contact with air is heated. Usually the distillate or the mixture of distillate and air may be preheated to the reaction temperature or the mixture may be heated in the reaction vessel. Alternatively, the distillate may be optionally preheated and passed downflow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amount of oxygen is 1.5 times that stoichiometrically required to react with the thiols, but amounts from 0.5 to 20 times the stoichiometric quantity have been used.

The distillate and air are passed into the reaction vessel containing the copper catalyst under appropriate conditions of temperature and pressure. The space velocity of the sour distillate is in general dependent upon the properties desired for the final product, the thiol content of the charge stock and the particular temperature chosen. A suitable space velocity is in the range of one to 50 liquid volume hourly space velocity based on the total flow, but the space velocity is usually in the range of from 1 to 10 LVHSV.

The sweetened product together with any excess air is passed from the catalyst bed into a suitable condenser which is maintained at a temperature sufficiently low to condense any distillate vapors. The air is separated from the distillate and a noncorrosive and "doctor sweet" product is recovered. The invention will be further described with reference to the following experimental work.

Example 1

The catalyst for this example was prepared as follows:
(1) 600 grams of $K_2SiO_3$ sol (about 30 weight percent $SiO_2$—purchased as Kasil) were dissolved in 6 liters of distilled water.
(2) 132 grams of $FeCl_3 \cdot 6H_2O$ were dissolved in 180 ml. of distilled water.
(3) The aqueous $FeCl_3 \cdot 6H_2O$ was slowly added to the aqueous $K_2SiO_3$ solution and gel began to form.
(4) The pH of the combined solutions was raised to 7.8 by adding with stirring 20 cc. of a dilute $NH_3$ aqueous solution (about 9% $NH_3$). The slurry of gelatinous material was allowed to stand overnight at room temperature.
(5) The gel was then separated by filtration and washed with distilled water until a constant conductivity was achieved.
(6) The gel was oven dried at 250° F. for 16 hours and calcined at 900° F. for 16 hours.
(7) 55.32 grams of this material were impregnated by incipient wetness with 68 cc. of an aqueous $CuCl_2$ solution containing 2.88 grams of $CuCl_2 \cdot H_2O$ to deposit 4% $CuCl_2$ on the finished catalyst.
(8) The copper impregnated catalyst was oven dried at 250° F. for 16 hours and calcined at 600° F. for 16 hours.
(9) The finished catalyst consisted of 18% $Fe_2O_3$, 74% $SiO_2$, 3.7% K, 1.9% Cu and 2% $Cl_2$.

Example 2

The catalyst from Example 1 above was used to sweeten a heavy distillate fuel oil whose properties are given on Table I below.

TABLE I.—HEAVY DISTILLATE FUEL OIL INSPECTIONS

| Inspection: | Heavy distillate fuel oil |
|---|---|
| Gravity, ° API | 40.4 |
| Viscosity, SUV, 100° F. | 37.3 |
| Flash, P–M, ° F. | 194 |
| Pour point, ° F. | +15 |
| Color, ASTM D–1500 | 0.5 |
| Total sulfur, weight percent | 0.12 |
| Mercaptan sulfur, p.p.m. | 394 |
| Total acid number, ASTM D–974 | 0.01 |
| Aniline point, ° F. | 175 |
| Distillation, ASTM D–86: | |
| Overpoint, ° F. | 428 |
| Endpoint, ° F. | 626 |
| 10% at (° F.) | 500 |
| 50% at (° F.) | 550 |
| 90% at (° F.) | 592 |

The sweetening reaction occurred by passing the heavy distillate together with 65 s.c.f. of air per bbl. upflow at 150° F.; 50 p.s.i.g. and a 9 liquid weight hourly space velocity through a bed of the catalyst. The sweetening activity was determined by testing the product oil at four-hour intervals using the doctor test (ASTM Test D–484) that is sensitive for detecting thiol sulfur concentrations of greater than about 3 p.p.m. on the product. The results are shown on Table II below.

Example 3

A catalyst similar to that in Example 1 above was prepared except the weight percent $CuCl_2$ was increased to ten. The support was a portion of that made in Example 1.

Example 4

The catalyst of Example 3 was used in a sweetening process as in Example 2 above and the throughput of sweet product increased to about 432. The results are summarized on Table II below.

TABLE II.—SWEETENING OF HEAVY DISTILLATE FUEL OIL

[Conditions: 150° F.; 50 p.s.i.g.; 9 LHSV; about 65 s.c.f. of air/bbl.]

| Example No.: | Percent of— | | Cu/Fe | Volume throughput of sweet product |
|---|---|---|---|---|
| | $CuCl_2$ | $Fe_2O_3$ | | |
| 2 | 4 | 18 | 0.132 | 180 |
| 4 | 10 | 20 | 0.297 | 432 |
| 7 | 4 | 25 | 0.095 | 90 |
| 8 | 10 | 25 | 0.237 | 54 |

A series of catalysts were made in a manner similar to that of Example 1 except the silica sol was substantially cation-free by passage initially through a protonated ion-exchange resin. The specific preparation of a catalyst containing 4% $CuCl_2$ is shown in Example 5 below.

Example 5

(1) 2,610 grams of sodium silicate solution (28.7% $SiO_2$) were admixed with 30 liters of $H_2O$ and passed through a bed of 300 grams of a protonated ion-exchange resin to produce a silica sol (pH 3 to 3.5);

(2) The resin was washed with 5 liters of $H_2O$ and the washings were added to the silica sol;

(3) The silica sol was thermally aged at 180° F. to 200° F. for 20 hours in order to produce a final gel with a higher average pore radius;

(4) 842 grams of $FeCl_3 \cdot 6H_2O$ were dissolved in five liters of water and added to the silicic acid solution;

(5) To the resulting mixture were added with constant mixing, in a flow stream, dilute aqueous ammonia (about 9% $NH_3$) in an amount sufficient to raise the pH of the resulting mixture to 8.

(6) The slurry was allowed to stand overnight and then filtered and the filter cake was washed with water containing 0.0003% $NH_3$. Washing of the filter cake was stopped when conductivity measurements fell to a constant level; and (7) The filter cake was oven dried for 16 hours at 250° F. and then calcined at 900° F. for 16 hours in air.

(8) The support was impregnated by incipient wetness with $CuCl_2 \cdot 2H_2O$ to deposit on the finished catalyst 4% $CuCl_2$.

(9) The impregnated support was oven dried at 250° F. for 16 hours and calcined at 600° F. for 16 hours.

Example 6

A catalyst similar to the catalyst of Example 5 was prepared except the weight percent $CuCl_2$ was increased to ten.

The catalysts from Examples 5 and 6 were tested in a manner similar to that for Example 2 above and the results are shown on Table II above as Examples 7 and 8.

Example 9

A catalyst was prepared in a manner similar to the catalyst of Example 1 except before the cogel was initially oven dried, that is, while the precipitated cogel was still gelatinous, sufficient aqueous copper chloride was dispersed into the cogel by physical mixing to yield a finished catalyst having about ten percent by weight copper chloride.

Example 10

Example 2 was repeated except using the catalyst of Example 9. The throughput of sweet product was 288.

When Example 10 was repeated except using an alkali-metal-free silica sol to prepare the catalyst, substantially the same results were obtained.

Resort may be had to such variations and modifications as fall within the spirit of the invention and the scope of the appended claims.

We claim:

1. A process for the oxidative sweetening of sour hydrocarbons which comprises contacting a sour hydrocarbon under sweetening conditions with a calcined catalytic composite comprising iron, silicon, oxygen and copper, said composite resulting from the steps of:
    forming a solution of (a) an alkali metal silicate selected from the group consisting of sodium silicate and potassium silicate and (b) an iron salt;
    cogelling said solution to form a wet gelatinous precipitate;
    adding a solution of a copper salt to said precipitate;
    drying and calcining said copper containing precipitate;
    the amount of said alkali metal silicate, said iron salt and said copper salt being such that the iron salt to silicon to oxygen atomic ratio in the final product is from about 1:2:5.5 to about 1:12:25.5 and the atomic ratio of the copper to iron salt is from 0.01:1 to 1.5:1.

2. A process according to claim 1 wherein the sour hydrocarbon is contacted with said composite in the presence of a gas containing free molecular oxygen.

3. A process according to claim 2 wherein the proportion of iron salt to silica sol is selected to result in a calcined cogelled product having an iron to silicon to oxygen atomic ratio of about 1:4:9.5; an atomic ratio of copper to iron from 0.1:1 to 1:1 and wherein the amount of iron is from about 10 to about 60 weight percent of said composite.

4. A process according to claim 3 wherein the sweetening conditions include a temperature from about 0° to about 300° F.; and a pressure from about 0 to about 500 p.s.i.g.

5. A process according to claim 1 wherein said wet gelatinous precipitate is dried before the addition of said copper salt solution.

6. A process according to claim 5 wherein said wet gelatinous precipitate is dried at a temperature from 200° F. to 300° F. for from 10 to 30 hours and then said dried precipitate is calcined in air at a temperature from 800° F. to 1000° F. for from 8 to 16 hours.

7. A process according to claim 6 wherein the sour hydrocarbon is contacted with said composite in the presence of a gas containing free molecular oxygen.

8. A process according to claim 7 wherein the proportion of iron salt to silica sol is selected to result in a calcined cogelled product having an iron to silicon to oxygen atomic ratio of about 1:4:9.5; an atomic ratio of copper to iron from 0.1:1 to 1:1 and wherein the amount of iron is from about 10 to about 60 weight percent of said composite.

9. A process according to claim 8 wherein the sweetening conditions include a temperature from about 0° to about 300° F.; and a pressure from about 0 to about 500 p.s.i.g.

References Cited

UNITED STATES PATENTS

| | | | |
|---|---|---|---|
| 3,491,020 | 1/1970 | Carr et al. | 208—189 |
| 2,042,054 | 5/1936 | Hoover | 208—191 |
| 2,080,365 | 5/1937 | Von Fuchs et al. | 208—191 |
| 3,076,858 | 2/1963 | Frevel et al. | 252—474 |
| 3,617,518 | 11/1971 | Sinfelt et al. | 252—474 |

DELBERT E. GANTZ, Primary Examiner

G. J. CRASANAKIS, Assistant Examiner

U.S. Cl. X.R.

252—459, 474

UNITED STATES PATENT OFFICE
CERTIFICATE OF CORRECTION

Patent No. 3,741,887        Dated  June 26, 1973

Inventor(s) Sun W. Chun, Harry A. Hamilton and Angelo A. Montagna

It is certified that error appears in the above-identified patent and that said Letters Patent are hereby corrected as shown below:

Col. 2, line 59 - delete line 59

Col. 2, line 60 - "$(Fe(Cl_4)_3 \cdot 6H_2O)$" should be --$(Fe(ClO_4)_3 \cdot 6H_2O)$--

Col. 2, line 60 - after "$Ni(C_2H_3O_2)_2;$" insert --$CoCl_2; CoF_2;$ and $Co(NO_3)_2$.--

Col. 2, line 67 - "finish" should be --finished--

Signed and sealed this 27th day of November 1973.

(SEAL)
Attest:

EDWARD M. FLETCHER, JR.
Attesting Officer

RENE D. TEGTMEYER
Acting Commissioner of Patents